United States Patent
Shi

(10) Patent No.: US 12,402,204 B2
(45) Date of Patent: Aug. 26, 2025

(54) DISCONTINUOUS RECEPTION CONTROL METHOD, DEVICE AND STORAGE MEDIUM

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 407 days.

(21) Appl. No.: 17/513,613

(22) Filed: Oct. 28, 2021

(65) Prior Publication Data
US 2022/0053596 A1  Feb. 17, 2022

Related U.S. Application Data

(63) Continuation of application No. PCT/CN2019/129422, filed on Dec. 27, 2019.

(51) Int. Cl.
  *H04W 76/28* (2018.01)
(52) U.S. Cl.
  CPC .................. *H04W 76/28* (2018.02)
(58) Field of Classification Search
  CPC .................. H04W 76/28; H04W 52/0248
  See application file for complete search history.

(56) References Cited

U.S. PATENT DOCUMENTS

| | | | |
|---|---|---|---|
| 10,420,028 B2 * | 9/2019 | Rahman | H04W 76/15 |
| 2010/0208660 A1 | 8/2010 | Ji | |
| 2011/0170420 A1 | 7/2011 | Xi et al. | |
| 2016/0192433 A1 | 6/2016 | Deenoo et al. | |

(Continued)

FOREIGN PATENT DOCUMENTS

| | | |
|---|---|---|
| CN | 101179825 A | 5/2008 |
| CN | 102932881 A | 2/2013 |

(Continued)

OTHER PUBLICATIONS

The second Office Action of corresponding European application No. 19957669.5, dated Apr. 3, 2023.

(Continued)

*Primary Examiner* — Kibrom T Hailu
(74) *Attorney, Agent, or Firm* — Ladas & Parry LLP

(57) ABSTRACT

Embodiments of the present application provide a discontinuous reception control method, a device, and a storage medium. A terminal device is provided with a plurality of discontinuous reception DRX groups. In specific implementation, the terminal device can receive a cycle switching instruction from a base station, and then control a target DRX group to perform discontinuous reception in accordance with a target cycle. The target DRX group is one or more DRX groups of the terminal device, and the target cycle is associated with the cycle switching instruction. The technical solutions provided by the embodiments of the present application can solve the problem of unclear switching strategy during DRX cycle switching in the terminal device, which reduces the impact on scheduling performance of the terminal, and saves electric quantity of the terminal.

16 Claims, 7 Drawing Sheets

(56) References Cited

U.S. PATENT DOCUMENTS

| | | | |
|---|---|---|---|
| 2020/0045768 A1* | 2/2020 | He | H04W 52/0216 |
| 2021/0144798 A1* | 5/2021 | Jiang | H04W 76/28 |
| 2021/0400699 A1* | 12/2021 | Nory | H04L 1/1819 |
| 2022/0353809 A1* | 11/2022 | Maleki | H04W 76/28 |
| 2023/0007725 A1* | 1/2023 | Li | H04W 24/02 |

FOREIGN PATENT DOCUMENTS

| | | |
|---|---|---|
| CN | 103889039 A | 6/2014 |
| CN | 103945505 A | 7/2014 |
| CN | 104219738 A | 12/2014 |
| CN | 107852627 A | 3/2018 |
| CN | 108307507 A | 7/2018 |
| CN | 110213837 A | 9/2019 |
| CN | 110572842 A | 12/2019 |
| KR | 20190111767 A | 10/2019 |
| WO | 2019182287 A1 | 9/2019 |

OTHER PUBLICATIONS

The second Office Action of corresponding Chinese application No. 202111145884.6, dated Apr. 8, 2023.

The Decision of Rejection of corresponding Chinese application No. 202111145884.6, dated Jun. 1, 2023.

The first Office Action of corresponding Chinese application No. 202111145884.6, dated Jan. 19, 2023 with machine translation.

The first Office Action of corresponding Chinese application No. 202111145884.6, dated Jan. 19, 2023.

International Search Report (ISR) dated Sep. 17, 2020 for Application No. PCT/CN2019/129422.

Ericsson. "Introduction of secondary DRX group", 3GPP TSG-RAN2 Meeting #108 Reno, USA, Nov. 18-22, 2019. R2-1915290, Nov. 12, 2019(Nov. 12, 2019).

RAN2 Chairman (Mediatek), 3GPP TSG-RAN WG2 Meeting #108; R2-19xxxxx, Draft Chair Notes.

The EESR of corresponding European application No. 19957669.5, dated Apr. 13, 2022.

Samsung:"Further Consideration on multiple C-DRX", 3GPP Draft; R2-1916152, 3rd Generation Partnership Project (3GPP), Mobile Competence Centre; 650, Route Des Lucioles; F-06921 Sophia-Antipolis Cedex; France, vol. RAN WG2, No. Reno, USA; Nov. 18, 2019-Nov. 22, 2019 Nov. 8, 2019(Nov. 8, 2019). XP051817696.

Qualcomm Inc:"Power saving enhancements for carrier aggregation", 3GPP Draft; R2-1903049, 3rd Generation Partnership Project (3GPP), Mobile Competence Centre; 650, Route Des Lucioles; F-06921 Sophia-Antipolis Cedex; vol. RAN WG2, No. Xi' an, China; Apr. 8, 2019-Apr. 12, 2019 Apr. 6, 2019(Apr. 6, 2019), XP051700406.

Written Opinion of the International Searching Authority dated Sep. 10. 2020 for Application No. PCT/CN2019/129422.

The Notice of Review of corresponding Chinese application No. 202111145884.6, dated Feb. 12, 2025.

The Notice of Review of corresponding Chinese application No. 202111145884.6, dated Mar. 19, 2025.

The Review decision of corresponding Chinese application No. 202111145884.6, dated Apr. 15, 2025.

* cited by examiner

DISCONTINUOUS RECEPTION CONTROL METHOD, DEVICE AND STORAGE MEDIUM

CROSS-REFERENCE TO RELATED APPLICATION

This application is a continuation of International Application No. PCT/CN2019/129422, filed on Dec. 27, 2019, the disclosure of which is hereby incorporated by reference in its entirety.

TECHNICAL FIELD

Embodiments of the present application relate to communication technologies and, in particular, to a discontinuous reception control method, a device, and a storage medium.

BACKGROUND

In 5G NR (5G New Radio) technology, a terminal device has a discontinuous reception (DRX) function, which enables the terminal device to discontinuously monitor a message from a base station, thereby saving more energy and power.

In the current NR standard, each medium access control (MAC) entity corresponds to one DRX configuration parameter. The DRX configuration parameter specifies a timing strategy with a long cycle and a short cycle. A terminal device can switch between the long cycle and the short cycle. Specifically, the terminal device can switch between the long cycle and the short cycle in response to a cycle switching instruction from a base station.

With the development of technology, one MAC entity can be configured with a plurality of DRX groups, and each DRX group corresponds to one DRX configuration parameter. In such scenario, when a terminal device receives a cycle switching instruction from a base station, the scheduling performance of the terminal device is affected since the cycle switching strategy of the DRX group is unclear.

SUMMARY

Embodiments of the application provide a discontinuous reception control method, a device, and a storage medium to solve the problem of unclear DRX cycle switching strategy when a terminal device has a plurality of DRX groups, which reduces the impact on scheduling performance of the terminal, and saves electric quantity of the terminal.

In a first aspect, an embodiment of the present application can provide a discontinuous reception control method, which is applied to a terminal device. The terminal device has one or more MAC entities, and there is at least one MAC entity provided with a plurality of discontinuous reception DRX groups, the method includes:
  receiving a cycle switching instruction from a base station; and
  controlling a target DRX group to perform discontinuous reception in accordance with a target cycle;
  where the target DRX group is one or more DRX groups of the MAC entity.

In a second aspect, an embodiment of the present application can provide a discontinuous reception control method, which is applied to a base station, and the method includes:
  generating, by the base station, a cycle switching instruction; and
  sending, by the base station, the cycle switching instruction to a terminal device to cause the terminal device to control a target DRX group to perform discontinuous reception in accordance with a target cycle, where the target DRX group is one or more DRX groups of an MAC entity in the terminal device.

In a third aspect, an embodiment of the present application can provide a terminal device, which has one or more MAC entities. There is at least one the MAC entities provided with a plurality of discontinuous reception DRX groups. The terminal device includes:
  a transceiving module, configured to receive a cycle switching instruction from a base station; and
  a processing module, configured to control a target DRX group to perform discontinuous reception in accordance with a target cycle, where the target DRX group is one or more DRX groups of the MAC entity.

In a fourth aspect, an embodiment of the present application can provide a base station, including:
  a processing module, configured to generate a cycle switching instruction; and
  a transceiving module, configured to send the cycle switching instruction to a terminal device to cause the terminal device to control a target DRX group to perform discontinuous reception in accordance with a target cycle, where the target DRX group is one or more DRX groups of an MAC entity in the terminal device.

In a fifth aspect, an embodiment of the present application can provide a terminal device, including:
  a processor, a memory and a transceiver;
  the memory stores computer execution instructions;
  the processor executes the computer execution instructions stored in the memory to cause the processor to execute the method as provided in any one of the first aspect.

In a sixth aspect, an embodiment of the present application can provide a base station, including:
  a processor, a memory and a transceiver;
  the memory stores computer execution instructions;
  the processor executes the computer execution instructions stored in the memory to cause the processor to execute the method as provided in any one of the second aspect.

In a seventh aspect, an embodiment of the present application can provide a computer-readable storage medium. The computer-readable storage medium stores thereon computer execution instructions, and the computer execution instructions, when executed by a processor, are used to implement the method as provided in any one of the first aspect.

In an eighth, an embodiment of the present application can provide a computer-readable storage medium. The computer-readable storage medium stores thereon computer execution instructions, and the computer execution instructions, when executed by a processor, are used to implement the method as provided in any one of the second aspect.

In a ninth aspect, an embodiment of the present application can provide a program, which, when executed by a processor, is used to execute the method as provided in any one of the above first aspect.

In a tenth aspect, an embodiment of the present application can provide a program, which, when executed by a processor, is used to execute the method as provided in any one of the above second aspect.

In an embodiment, the above-mentioned processor can be a chip.

In an eleventh aspect, an embodiment of the present application provides a computer program product, including program instructions, and the program instructions are used to implement the method provided in any one of the first aspect.

In a twelfth aspect, an embodiment of the present application provides a computer program product, including program instructions, and the program instructions are used to implement the method provided in any one of the second aspect.

In a thirteenth aspect, an embodiment of the present application provides a chip, including a processing module and a communication interface, and the processing module can execute the method provided in any one of the first aspect.

Further, the chip also includes a storage module (such as a memory), configured to store instructions, and a processing module, configured to execute the instructions stored in the storage module, and execution of the instructions stored in the storage module causes the processing module to execute the method provided in any one of the first aspect.

In a fourteenth aspect, an embodiment of the present application provides a chip, including a processing module and a communication interface, and the processing module can execute the method provided in any one of the second aspect.

Further, the chip also includes a storage module (such as a memory), configured to store instructions, and a processing module, configured to execute the instructions stored in the storage module, and execution of the instructions stored in the storage module causes the processing module to execute the method provided in any one of the second aspect.

In a fifteenth aspect, an embodiment of the present application provides a communication system, including:

a terminal device, configured to execute the method provided in any one of the first aspect;

a base station, configured to execute the method provided in any one of the second aspect.

The embodiments of the application provide a discontinuous reception control method, device, and storage medium. This solution is applicable to a terminal device that has at least one MAC entity provided with a plurality of DRX groups. When the terminal device receives a cycle switching instruction from a base station, it can control its one or more DRX groups to perform discontinuous reception in accordance with a target cycle associated with the cycle switching instruction. The embodiments of the application provide a DRX cycle switching strategy for the terminal device provided with a plurality of DRX groups, which solve the problem of unclear DRX cycle switching strategy in this scenario, thereby reducing the impact of this problem on scheduling performance of the terminal, and it is conducive to save electric quantity of the terminal.

BRIEF DESCRIPTION OF THE DRAWINGS

To illustrate the technical solutions in embodiments of the present application or in the prior art more clearly, the following briefly introduces the accompany drawings needed for describing the embodiments or the prior art. Apparently, the accompanying drawings in the following description are some embodiments of the present application, and for those of ordinary skill in the art, they may still obtain other drawings according to these accompanying drawings without creative effort.

DESCRIPTION OF EMBODIMENTS

To make the objectives, technical solutions, and advantages of embodiments of the present application clearer, the following clearly and comprehensively describes the technical solutions in embodiments of the present application with reference to the accompanying drawings in embodiments of the present application. Apparently, the described embodiments are merely a part rather than all embodiments of the present application. All other embodiments obtained by those of ordinary skill in the art based on embodiments of the present application without creative effort shall fall within the protection scope of the present application.

The terms "first", "second" and etc. (if present) in the description, claims and the above accompanying drawings of the present application are used to distinguish similar objects, and not necessarily used to describe a specific order or sequence. It should be understood that the terms used in this way can be interchanged under appropriate circumstances, so that the embodiments of the present application described herein can be implemented in an order other than those illustrated or described herein, for example. Furthermore, the terms "including" and "comprising" as well as any variations thereof are intended to cover non-exclusive inclusions. For example, processes, methods, systems, products or devices including a series of steps or units are not be limited to those steps or units explicitly listed, but may include other steps or units not explicitly listed or inherent to these processes, methods, products or devices.

Discontinuous reception (DRX) is a function of intermittently monitoring a physical downlink control channel (PDCCH).

Figure 1:
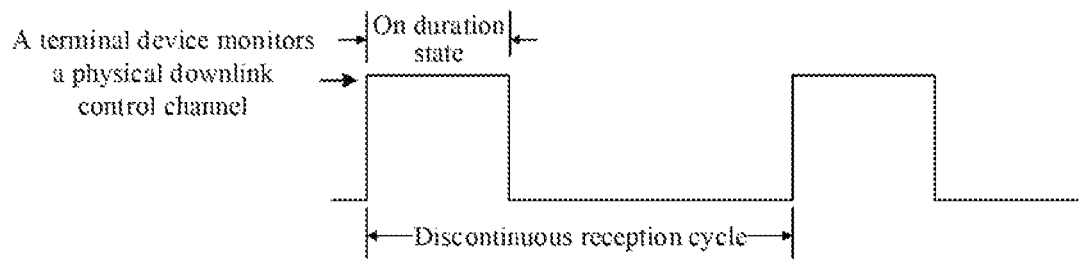
FIG. 1 is a schematic diagram of a working principle of discontinuous reception performed by a terminal device in the present application.

Exemplarily, FIG. 1 shows a schematic diagram of a working principle of discontinuous reception (DRX) performed by a terminal device. As shown in FIG. 1, the terminal device can perform discontinuous reception in accordance with a DRX cycle, and a DRX configuration parameter for the terminal is also mainly configured for the DRX cycle.

As shown in FIG. 1, in one DRX cycle, the terminal device can have an active state (or called: wake-up state, On Duration state) and a dormant state (or called: sleep state, opportunity for DRX state). When the terminal device is in the active state, the terminal device can start a receiver to monitor (or called: receive) a PDCCH: when the terminal device is in the dormant state, it can turn off the receiver to not monitor a PDCCH. In one DRX cycle as shown in FIG. 1, when the terminal device is in the On Duration state, it monitors the PDCCH from a base station; when it is in the opportunity for DRX state, it does not monitor the PDCCH. As such, the discontinuous reception function of the terminal device is realized.

The terminal device realizes the discontinuous reception function, which can be realized through a timer. A timing duration of the timer is associated with a DRX configuration parameter. The terminal device can configure timing durations of respective timers in accordance with the DRX configuration parameter. After the configuration is completed, the terminal device can realize the discontinuous reception function through controlling respective timers to begin or stop timing.

In an actual scenario, the DRX configuration parameter can be from a base station. The terminal device can receive the DRX configuration parameter from the base station. In this scenario, the DRX parameter can be a separate message sent by the base station to the terminal device, or it can be carried in another message and sent by the base station to the terminal device.

Furthermore, the DRX configuration parameter can also be from user setting. At this point, the terminal device can receive the DRX configuration parameter input by a user.

In the embodiments of the present application, the DRX configuration parameter can include, but is not limited to, a configuration of timing durations of the following timers.

drx-onDurationTimer, that is, a discontinuous reception on duration timer. In any one DRX cycle, the timer is configured to time a duration of the terminal device in the active state within the DRX cycle. As shown in FIG. 1, during the duration of the timer, the terminal device can start the receiver to continuously monitor the PDCCH.

drx-Slot Offset, that is, a discontinuous reception slot offset timer. In any DRX cycle, the timer is configured to time a slot offset for the terminal device to start the drx-onDurationTimer.

drx-InactivityTimer, that is, a discontinuous reception inactivity timer. The timer is configured to time a duration of the terminal continuing to monitor the PDCCH after receiving any initial transmission PDCCH. The initial transmission PDCCH can include, but is not limited to: a PDCCH indicating uplink initial transmission or a PDCCH indicating downlink initial transmission. Distinguished from repetition, the initial transmission refers to a transmission for the first time.

drx-RetransmissionTimerDL, that is, a discontinuous reception downlink retransmission timer. The timer is configured to time a longest duration of a PDCCH indicating a downlink retransmission scheduling. In a specific implementation scenario, except for a broadcast hybrid automatic repeat request (HARQ) process, each downlink HARQ process corresponds to a drx-RetransmissionTimerDL.

drx-RetransmissionTimerUL, that is, a discontinuous reception uplink retransmission timer. The timer is configured to time a longest duration of a PDCCH indicating an uplink retransmission scheduling. In a specific implementation scenario, each uplink HARQ process corresponds to a drx-RetransmissionTimerUL.

drx-LongCycleStartOffset, that is, a discontinuous reception long cycle start offset (timer). The timer is configured to time a subframe offset at the beginning of a long cycle. In addition, it can also time a subframe offset at the beginning of both long cycle and short cycle.

drx-ShortCycleTimer, that is, a discontinuous reception short cycle timer. The timer is configured to time a duration when the terminal device is in a short cycle (and does not receive any PDCCH).

drx-HARQ-RTT-TimerDL, that is, a discontinuous reception downlink HARQ Round-Trip Time (RTT) timer. The timer is configured to time a minimum waiting time required for the terminal device to expect to receive a PDCCH indicating a downlink scheduling. Except for a broadcast HARQ process, each downlink HARQ process corresponds to a drx-HARQ-RTT-TimerDL.

drx-HARQ-RTT-TimerUL, that is, a discontinuous reception uplink HARQ Round-Trip Time timer. The timer is configured to time a minimum waiting time required for the terminal device to expect to receive a PDCCH indicating an uplink scheduling. Each uplink HARQ process corresponds to a drx-HARQ-RTT-TimerUL.

It should also be noted that in the existing mechanism, the long cycle (or can be called: Long DRX Cycle, or Long Cycle) is a default configuration, and the short cycle (or can be called: Short DRX Cycle, or Short Cycle) is an optional configuration.

Based on this, the aforementioned DRX configuration parameters may include a configuration parameter for drx-ShortCycleTimer, or may not include the configuration parameter for drx-ShortCycleTimer.

It can be understood that if the terminal device is not provided with a DRX configuration parameter of a short cycle related timer, the terminal device can continuously perform discontinuous reception in accordance with the long cycle.

In the application scenario to which the embodiments of the present application are applicable, the terminal device has the configuration parameter of drx-ShortCycleTimer. That is, the terminal device is provided with a DRX long cycle and a short cycle. At this point, the terminal device can implement discontinuous reception in accordance with the long cycle or the short cycle. It should be understood that a cycle duration of the long cycle is greater than a cycle duration of the short cycle.

For the terminal device provided with drx-ShortCycleTimer, it can also switch between the long cycle and the short cycle. The current protocol specifies a trigger mode for the terminal device to perform switching between the long cycle and the short cycle.

On the one hand, the terminal device can adopt the short cycle for discontinuous reception when any one or more of the following conditions is met:
  drx-InactivityTimer time expires; and
  the terminal device receives a DRX Command MAC CE (or called: DRX MAC CE).

On the other hand, the terminal device can adopt the long cycle for discontinuous reception when any one or more of the following conditions is met:
  drx-ShortCycleTimer expires; and
  the terminal receives a long DRX command MAC CE (or called: Long DRX MAC CE).

The DRX Command MAC CE (Discontinuous Reception DRX Command Medium Access Control Element) is a discontinuous reception command MAC control element, which is used to instruct the terminal device to adopt a short cycle for discontinuous reception in the prior art; and the long DRX command MAC CE is a long cycle discontinuous reception command MAC control element, which is used to instruct terminal device to adopt a long cycle for discontinuous reception in the prior art. Both of them can be used as a cycle switching instruction to instruct the terminal device to switch between the long cycle and the short cycle.

In the existing NR standard, each terminal device has one or more MAC entities, and one MAC entity corresponds to one DRX configuration parameter. Then, if a terminal device receives a DRX MAC CE, it uses a short cycle for discontinuous reception; if a terminal device receives a Long DRX MAC CE, it uses a long cycle for discontinuous reception.

However, as described in the above-mentioned background, with the development of technology, one MAC entity can configure a plurality of DRX groups, and each DRX group corresponds to one DRX configuration parameter. In such scenario, there is a problem that the cycle switching strategy is unclear, which affects scheduling performance of the terminal device.

In an exemplary scenario, a terminal device has an MAC entity, and the MAC entity can be provided with 2 DRX groups. At this point, if the terminal receives a DRX MAC CE, it is unclear whether the MAC entity of the terminal device controls both DRX groups to adopt a short cycle for discontinuous reception, or controls one of the DRX groups to adopt the short cycle for discontinuous reception, and if the MAC entity of the terminal device controls one of the DRX groups to adopt the short cycle for discontinuous reception, which group is controlled to adopt the short cycle for discontinuous reception. There is a lack of a solution for the terminal device to perform DRX cycle switching strategy in this scenario in prior art.

The technical solutions provided in the embodiments of the present application intend to solve the above technical problem in the prior art.

The discontinuous reception control method provided by the present application will be described below.

Figure 2:
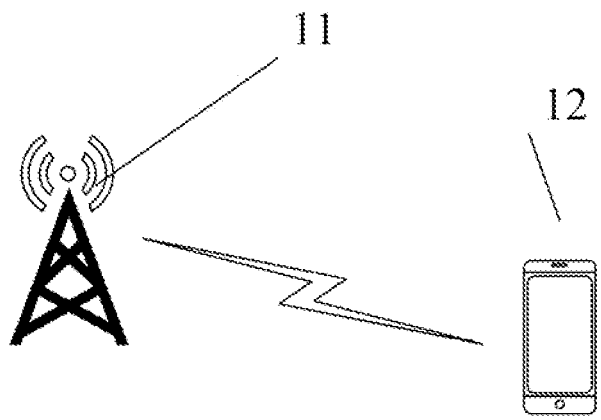
FIG. 2 is a schematic diagram of a communication system provided by an embodiment of the present application.

FIG. 2 shows a schematic diagram of a communication system provided by an embodiment of the present application. As shown in FIG. 2, the communication system at least includes a network device 11 and a terminal device 12. It can be understood that in an actual communication system, both the number of the network device 11 and the number of the terminal device 12 may be one or more, and FIG. 2 takes the number of 1 as an example.

In FIG. 2, the network device 11 may be an access device in a cellular network, for example, it may be an access device in an LTE network and evolved network thereof, such as an evolutional node B (eNB or eNodeB for short), or a relay station, or a base station in a new network system in the future and so on. It may also be a device such as an access point (AP for short) in the WLAN.

The terminal device 12 may also be referred to as a mobile terminal, a user equipment (UE for short), an access terminal, a user unit, a user station, a mobile station, a mobile table, a user terminal, a terminal, a wireless communication device, a user agent, or a user apparatus. Specifically, it may be a smartphone, a cellular phone, a cordless phone, a personal digital assistant (PDA) device, a handheld device with wireless communication function, or another processing device connected to a wireless modem, an in-vehicle device, a wearable device and the like. In the embodiments of the present application, the terminal device has an interface communicated with a network device (e.g., a cellular network).

The communication system shown in FIG. 2 can be applied to a carrier aggregation (CA) scenario.

Further, the terminal device 12 involved in the embodiment of the present application has a DRX function. The terminal device 12 has one or more MAC entities, and there is at least one MAC entity which can be provided with a plurality of DRX groups, and each DRX group can correspond to one DRX configuration parameter. In addition, cross-carrier scheduling is not supported between any two DRX groups.

In the present application, if the terminal device has a plurality of MAC entities, any MAC entity can be provided with a plurality of DRX groups. For example, the terminal device has 2 MAC entities, and each MAC entity is provided with 2 DRX groups. Alternatively, among the plurality of MAC entities of the terminal device, there are a part of MAC entities provided with a plurality of DRX groups, and there is also a case in which a part of MAC entities are provided with one DRX group. For example, the terminal device has 2 MAC entities, one MAC entity is provided with 2 DRX groups, and the other MAC entity is provided with 2 DRX groups.

For ease of description in the following, a case where a terminal device has one MAC entity, and the MAC entity is provided with a plurality of DRX groups is taken as an example. It should be understood that, for any MAC entity of the plurality of MAC entities, control of the discontinuous reception can be performed in accordance with a technical solution provided by embodiments of the present application.

For any terminal device, DRX configuration parameters of a plurality of DRX groups configured thereby can be different. It should be understood that the DRX configuration parameters being different mentioned here means that there is at least one DRX configuration parameter being different.

In an exemplary embodiment, the terminal device meets at least one of following: durations of the discontinuous reception on duration timers (drx-onDurationTimers) of any two DRX groups in the terminal device are different; or, durations of discontinuous reception inactivity timers (drx-InactivityTimers) of any two DRX groups in the terminal device are different. In this embodiment, other DRX configuration parameters can be the same or can be different.

On this basis, the present application also provides another embodiment: in any two DRX groups in the terminal device, one or more of drx-InactivityTimer and drx-onDurationTimer are different; and configuration parameters of timers except for drx-InactivityTimer and drx-onDurationTimer can be the same. At this point, the configuration parameters of timers except for drx-InactivityTimer and drx-onDurationTimer can be called common parameters (or called: common configuration, common configuration parameter, etc.).

In the embodiments of the present application, one terminal device can also correspond to a plurality of serving cells. The plurality of serving cells can include: a primary cell (PCell), and one or more secondary cells (SCells).

For any DRX group in the terminal device, one DRX group can correspond to one or more serving cells. At this point, there is at least one DRX group corresponding to the PCell. The serving cell corresponding to the DRX group means that the serving cell performs discontinuous reception in accordance with the DRX configuration parameter of the DRX group.

Figure 3:
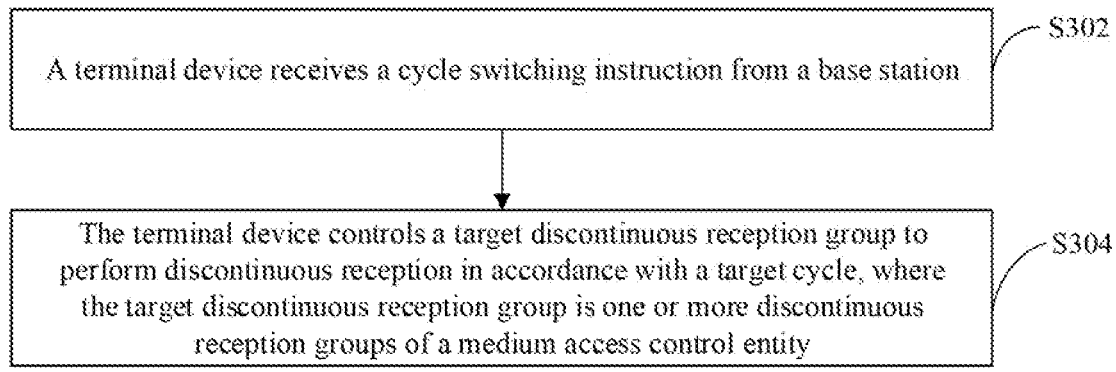
FIG. 3 is a schematic diagram of another discontinuous reception control method provided by an embodiment of the present application.

The discontinuous reception control method provided in the present application can be referred to FIG. 3, and the method includes the following steps:

S302: a terminal device receives a cycle switching instruction from a base station; and S304: the terminal device controls a target DRX group to perform discontinuous reception in accordance with a target cycle, where the target DRX group is one or more DRX groups of an MAC entity.

The target cycle can be a long cycle or a short cycle. Whether a long cycle or a short cycle is specifically adopted is associated with the cycle switching instruction received by the terminal device.

In this scheme, the terminal device can control one or more DRX groups configured thereby to perform cycle switching based on the received cycle switching instruction. The embodiment of the present application gives a DRX cycle switching strategy for the terminal device provided with a plurality of DRX groups, which solves the problem that DRX cycle switching strategy is unclear under the scenario, and reduces the impact of the problem on scheduling performance of the terminal, and is conducive to save electric quantity of the terminal.

In embodiments of the present application, the cycle switching instruction is associated with the target cycle. At this point, the cycle switching instruction can be used to indicate one target cycle. For example, the cycle switching instruction can indicate only one short cycle. Alternatively, the cycle switching instruction can also be used to indicate a plurality of target cycles. At this point, the number of target cycles indicated in the cycle switching instruction can be less than or equal to the number of DRX groups. For example, the terminal device is provided with 3 DRX groups, and the cycle switching instruction can indicate 3 target cycles. The control manner of the terminal device and the indicating manner will be described in detail subsequently.

Based on this, when S304 is specifically implemented, the following implementation manners may be included at least:

Manner 1, the cycle switching instruction is used to indicate one target cycle. At this point, the target DRX group can be all DRX groups of the MAC entity;

Manner 2, the cycle switching instruction is used to indicate one target cycle. At this point, the target DRX group can be a DRX group where a serving cell that receives the cycle switching instruction is located;

Manner 3, the cycle switching instruction is used to indicate one target cycle. At this point, the target DRX group is a DRX group corresponding to the cycle switching instruction;

Manner 4, the cycle switching instruction is used to indicate a plurality of target cycles. Specifically, the cycle switching instruction can include a plurality of indication characters, and the indication characters correspond to the DRX groups one-to-one. At this point, the indication characters are respectively used to indicate a target cycle of a corresponding DRX group.

Then, when S304 is performed, the terminal device determines the target cycle of each DRX group in accordance with the plurality of indication characters, and then switches DRX cycles of respective DRX groups to the target cycle.

The above-mentioned four implementation manners will be described in detail below in combination with a specific embodiment.

In any one of the foregoing implementation manners, any DRX group has a target cycle, and the target cycle may be a long cycle or a short cycle.

Based on this, for any DRX group, if the target cycle indicated by the base station is the long cycle, when S304 is performed, the terminal device controls a discontinuous reception short cycle timer (drx-ShortCycleTimer) of the target DRX group to stop timing.

At this point, the start time of drx-onDurationTimer is related to the current cycle type.

On the one hand, for one DRX group, if the DRX group is in the short cycle, the terminal device determines a time to start the drx-onDurationTimer in accordance with the following manner.

First, it is determined whether a value the current subframe number modulo on a short cycle duration (drx-ShortCycle) is equal to a value of the subframe offset at the beginning of the long cycle (drx-StartOffset) modulo on the short cycle duration. In other words, that is, it is determined whether the current subframe meets the following formula: [(SFN×10)+subframe number] modulo (drx-ShortCycle)= (drx-StartOffset) modulo (drx-ShortCycle), where [(SFN× 10)+subframe number] represents the current subframe number, drx-ShortCycle represents the short cycle duration, and modulo represents a modulus operation.

Afterwards, if the current subframe number meets the aforementioned condition, drx-Slot Offset is started from the current frame to begin timing, and when timing of the drx-Slot Offset ends, the drx-onDurationTimer is started.

On the other hand, for one DRX group, if the DRX group is in a long cycle, the terminal device determines the time to start the drx-onDurationTimer in accordance with the following manner.

First, it is determined whether a value of the current subframe number modulo on a long cycle duration (drx-LongCycle) is equal to a value of the subframe offset at the beginning of the long cycle (drx-StartOffset)modulo on a short cycle duration. In other words, that is, it is determined whether the current subframe meets the following formula: [(SFN×10)+subframe number] modulo (drx-LongCycle) =drx-StartOffset, where [(SFN×10)+subframe number] represents the current subframe number, drx-LongCycle represents the long cycle duration, and modulo represents a modulus operation.

Afterwards, if the current subframe number meets the aforementioned condition, drx-Slot Offset is started from the current frame to begin timing, and when timing of the drx-Slot Offset ends, the drx-onDurationTimer is started.

The start of drx-InactivityTimer is related to whether the terminal device receives a PDCCH indicating downlink or uplink initial transmission. When the terminal device receives the PDCCH indicating the downlink or uplink initial transmission, the terminal device controls the drx-InactivityTimer to begin timing.

Exemplarily, when the terminal device receives a PDCCH indicating downlink transmission, or when the terminal device receives an MAC PDU on a configured downlink grant resource, the terminal device stops a drx-RetransmissionTimerDL corresponding to a HARQ process. The terminal device starts a drx-HARQ-RTT-TimerDL corresponding to the HARQ process after completing a transmission fed back through the HARQ process for this downlink transmission.

If the tinier drx-HARQ-RTT-TimerDL corresponding to a certain HARQ of the terminal device expires, and downlink data transmitted using this HARQ process is not successfully decoded, then the terminal device starts the drx-RetransmissionTimerDL corresponding to this HARQ process.

A condition for the terminal device to start and stop drx-RetransmissionTimerUL is that:

when the terminal device receives a PDCCH indicating uplink transmission, or when the terminal device sends an MAC PDU on the configured uplink grant resource, the terminal device stops a drx-RetransmissionTimerUL corresponding to a HARQ process. The terminal device starts a drx-HARQ-RTT-TimerUL corresponding to the HARQ process after completing the first repetition of this PUSCH.

If the timer drx-HARQ-RTT-TimerUL corresponding to a certain HARQ of the terminal device expires, the terminal device starts the drx-RetransmissionTimerUL corresponding to this HARQ process.

For any DRX group, if the target cycle indicated by the base station is the short cycle, when S304 is performed, the terminal device controls a discontinuous reception on duration timer (drx-onDurationTimer) and a discontinuous reception inactivity timer (drx-InactivityTimer) of the target DRX group to stop timing, and control a discontinuous reception short cycle timer (drx-ShortCycleTimer) of the target DRX group to begin timing.

It should be noted that, when the aforementioned step S304 is performed, if the cycle currently used by the DRX group is consistent with the target cycle, there is no need to repeatedly turn on or turn off the timer.

Exemplarily, when the cycle switching instruction received by the terminal device is associated with the long cycle, and the target DRX group currently uses the long cycle to perform DRX, at this point, the drx-ShortCycleTimer itself of the target DRX group is in a closed state, then there is no need to perform the aforementioned action of turning off the drx-ShortCycleTimer.

In other words, when the processing of aforementioned S304 is performed, it can also first determine whether the currently used cycle of the target DRX is consistent with the target cycle. If they are consistent, no additional processing is needed. If they are inconsistent, processing can be performed in accordance with the aforementioned manner.

In the embodiment of the present application, the DRX configuration parameter of the terminal device can be from the base station. At this point, before executing the method shown in FIG. 3, the terminal device can also receive a DRX configuration instruction from the base station. The DRX configuration instruction carries configuration parameters of respective DRX groups. The terminal device then can perform DRX configuration on respective DRX groups respectively in accordance with the configuration parameters.

The configuration parameters carried in the DRX configuration instruction may include, but are not limited to: DRX configuration parameters (respective drx-onDurationTimers, drx-InactivityTimers, and the like of respective DRX groups and common parameters), serving cell configuration parameters (or called: SCell related parameters). In addition, they may also include, but not limited to: uplink logical channel related configuration, scheduling request (Scheduling Request, SR) related configuration, and the like.

In a possible embodiment, a message type of the DRX configuration instruction can be a radio resource control (RRC) message.

Now the foregoing implementation methods (manner 1 to manner 4) is described in detail by taking a scenario where the terminal device is provided with two DRX groups as an example, and in combination with FIG. 4 to FIG. 7.

In this scenario, the terminal device is provided with two DRX groups, that is, DRX group1 and DRX group2 respectively, and the terminal device has 4 serving cells in total, among which DRX group1 corresponds to PCell and SCell1, and DRX group2 corresponds to SCell2 and SCell3.

In this scenario, the terminal device can first receive the DRX configuration instruction from the base station, and then configure respective DRX groups according to respective configuration parameters carried therein. The configuration content includes: DRX configuration parameters, SCell related parameters, and uplink logical channel related configuration, SR related configuration, and the like.

On this basis, when the terminal device performs discontinuous reception, it can implement discontinuous reception in accordance with any one of the following manners.

Manner 1

In manner 1, the cycle switching instruction is used to indicate one target cycle. At this point, the target DRX group can be all DRX groups of the MAC entity.

Exemplarily, the cycle switching instruction can be a DRX MAC CE or a Long DRX MAC CE, where the DRX MAC CE is associated with a short cycle (the target cycle is a short cycle), and the Long DRX MAC CE is associated with a long cycle (the target cycle is a long cycle).

At this point, there can be the following two possible cases.

In a possible embodiment, if the terminal device is in any serving cell, and receives the DRX MAC CE (cycle switching instruction) from the base station, then at this point, the terminal device needs to control both DRX group1 and DRX group2 to adopt a short cycle for discontinuous reception.

If the DRX group1 currently adopts the Long DRX Cycle (long cycle), the terminal device controls a drx-InactivityTimer and a drx-onDurationTimer corresponding to DRX group1 to stop timing. At the same time, the terminal device also starts the drx-ShortCycleTimer to cause the drx-ShortCycleTimer to begin timing. As such, DRX group1 uses the Short DRX Cycle (short cycle) for discontinuous reception. If DRX group2 currently uses the Short DRX Cycle (short cycle), no additional processing is required.

In another possible embodiment, if the terminal device is in any one serving cell, and it receives the Long DRX MAC CE (cycle switching instruction) from the base station. At this point, the terminal device needs to control both DRX group1 and DRX group2 to adopt a long cycle for discontinuous reception.

If DRX group1 currently adopts the Short DRX Cycle (short cycle), the terminal device controls the drx-ShortCycleTimer corresponding to DRX group1 to stop timing. As such. DRX group1 uses the Long DRX Cycle (long cycle) for discontinuous reception. If DRX group2 currently adopts the Long DRX Cycle (long cycle), no additional processing is required.

It should be noted that in this embodiment, the cycle switching instruction is used to control the two DRX groups of the terminal device to perform discontinuous reception in accordance with the target cycle. However, in the embodiments of the present application, when the terminal device receives the cycle switching instruction, the DRX cycle respectively adopted by these two DRX groups is not particularly limited. In other words, when the terminal device receives the cycle switching instruction, the two DRX groups can both adopt a short cycle (or a long cycle) for discontinuous reception. Alternatively, one DRX group can use a short cycle, and the other DRX group can use a long cycle. These are not exhaustively.

Figure 4:
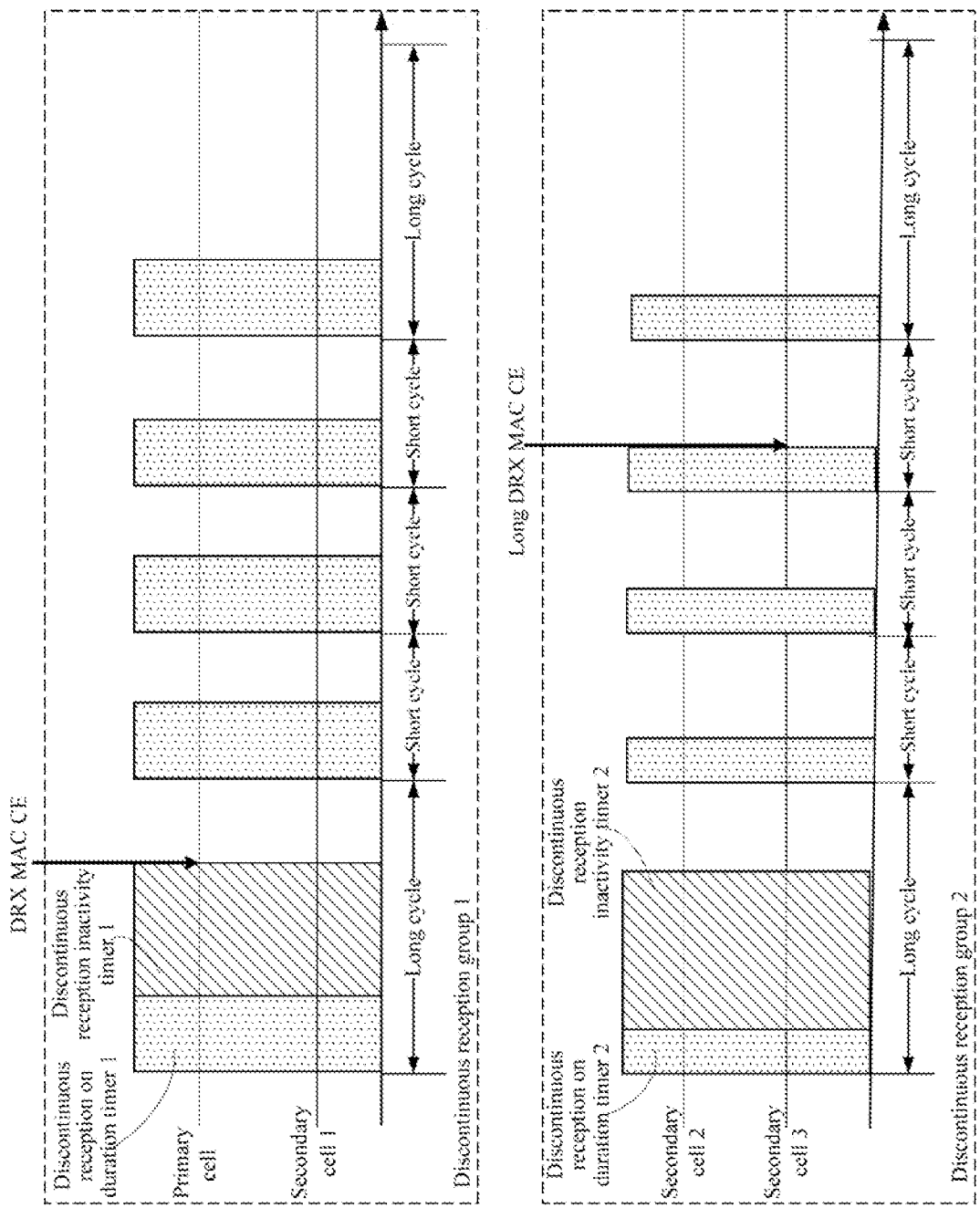
FIG. 4 is a schematic diagram of a discontinuous reception control method provided by an embodiment of the present application.

Exemplarily, FIG. 4 shows a schematic diagram of a discontinuous reception case of a terminal device in this scenario.

In the scenario shown in FIG. 4, the terminal device can configure drx-onDurationTimer1 and drx-InactivityTimer1 for DRX group1, and configure drx-onDurationTimer2 and drx-InactivityTimer2 for DRX group2. In addition to these, other DRX configuration parameters such as drx-ShortCycleTimer, drx-LongCycleStartOffset, and the like are common configuration of the two DRX groups.

The terminal device is also provided with 4 serving cells, where PCell and SCell 1 correspond to a transmission mode (Frame Relay, FR) 1, and SCell 2 and SCell 3 correspond to FR2.

As shown in FIG. 4, in an initial state, both DRX group 1 and DRX group 2 use the Long DRX Cycle. For the DRX group1, drx-onDurationTimer1 is started periodically in accordance with the Long DRX cycle. For the DRX group2, drx-onDurationTimer2 is started periodically in accordance with the Long DRX cycle.

Afterwards, the terminal device receives the DRX MAC CE on the PCell, the target cycle is the short cycle, then the terminal device controls all of drx-onDurationTimer1, drx-InactivityTimer1, drx-onDurationTimer2, and drx-InactivityTimer2 to stop timing. At the same time, the terminal device controls drx-ShortCycleTimer to begin timing. Therefore, as shown in FIG. 4, both DRX group 1 and DRX group 2 are switched from the Long DRX Cycle to the Short DRX Cycle.

Afterwards, the terminal device receives the Long DRX MAC CE on the SCell 3, the target cycle is a long cycle, then the terminal device controls the drx-ShortCycleTimer to stop timing.

At this point, DRX group1 is in a short cycle, then the terminal device calculates whether the time to start drx-onDurationTimer1 is met in accordance with following manner: first it is determined whether the current subframe meets the following formula: [(SFN×10)+subframe number] modulo (drx-ShortCycle)=(drx-StartOffset) modulo (drx-ShortCycle), where [(SFN×10)+subframe number] represents the current subframe number, drx-ShortCycle represents the short cycle duration, and modulo represents a modulus operation. Afterwards, if the current subframe number meets the aforementioned conditions, the drx-Slot Offset is started from the current frame to begin timing, and when its timing ends, the drx-onDurationTimer1 is started. The startup manner of the DRX group2 is the same as that of DRX group1, which will not be described repeatedly.

It can be understood that it is exemplary that the cycle switching instruction is the DRX MAC CE or the Long DRX MAC CE. In an actual scenario, the cycle switching instruction can also be other variations, for example, establishing an association relation between other RRC messages and the long cycle (or short cycle).

In manner 1, no matter which serving cell or which DRX group receives the cycle switching instruction, the cycle switching processing is performed for all DRX groups at the same time. This centralized management manner is simple and easy to implement, which is beneficial to save electric quantity of the terminal device.

Manner 2

In manner 2, the cycle switching instruction is used to indicate one target cycle. At this point, the target DRX group may be a DRX group where the serving cell that receives the cycle switching instruction is located.

In this implementation, the cycle switching instruction can still be the DRX MAC CE or the Long DRX MAC CE, where the DRX MAC CE is associated with a short cycle (the target cycle is a short cycle), and the Long DRX MAC CE is associated with a long cycle (the target cycle is a long cycle).

At this point, there are also the following two possible cases.

In a possible embodiment, if the terminal device is in any serving cell, and receives the DRX MAC CE (cycle switching instruction) from the base station, at this point, the terminal device controls a DRX group corresponding to the serving cell to adopt a short cycle for discontinuous reception. While the DRX group that does not have a corresponding relation with the serving cell still uses an original cycle.

In another possible embodiment, if the terminal device is in any serving cell, and receives the Long DRX MAC CE (cycle switching instruction) from the base station, then at this point, the terminal device controls the DRX group corresponding to the serving cell to adopt a long cycle for discontinuous reception. While the DRX group that does not have a corresponding relation with the serving cell still uses an original cycle.

Figure 5:
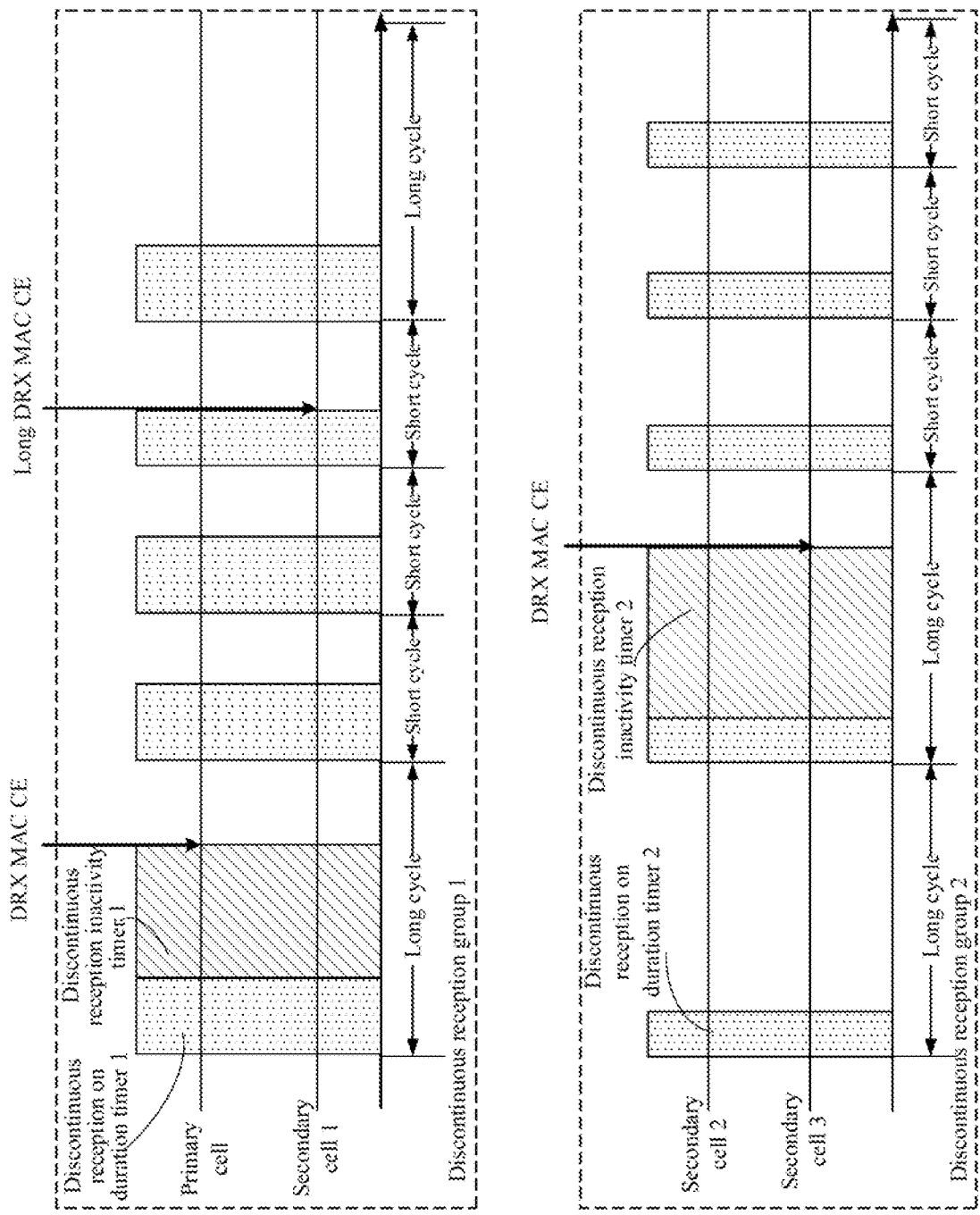
FIG. 5 is a schematic diagram of another discontinuous reception control method provided by an embodiment of the present application.

Exemplarily, reference may be made to the case shown in FIG. 5. The case of DRX configuration in FIG. 5 is the same as that in FIG. 4, which will not be described repeatedly here.

As shown in FIG. 5, in the initial state, both DRX group 1 and DRX group 2 use the Long DRX Cycle.

Afterwards, the terminal device receives the DRX MAC CE from the base station on the PCell, the target cycle is a short cycle, and the target DRX group is the DRX group1. The terminal device controls the drx-onDurationTimer1 and the drx-InactivityTimer1 to stop timing, and at the same time, adopts the drx-ShortCycleTimer1 to begin timing for the DRX group1.

At this point, the DRX group1 is switched from the Long DRX Cycle to the Short DRX Cycle, while the DRX group2 still uses Long DRX Cycle.

Afterwards, the terminal device receives the DRX MAC CE from the base station on the SCell 3, the target cycle is a short cycle, and the target DRX group is DRX group2. At this point, the terminal device can control the drx-onDurationTimer2 and the drx-InactivityTimer2 to stop timing, and at the same time, control the DRX group2 to adopt the drx-ShortCycleTimer2 to begin timing.

It should be understood that the drx-ShortCycleTimer1 and the drx-ShortCycleTimer2 are two separate timers with the same timing duration (in this scenario, the timing duration of the timer is a common parameter, and thus they are equal; they can also be different in the actual scenario, the DRX groups are respectively set respectively).

At this point, the DRX group1 uses the Short DRX Cycle, while the DRX group2 is switched from the Long DRX Cycle to the Short DRX Cycle.

Afterwards, the terminal device receives the Long DRX MAC CE from the base station on SCell1, the target cycle is a long cycle, and the target DRX group is DRX group1. At this point, the terminal device controls the drx-ShortCycleTimer1 to stop timing. Then, the terminal device can determine a start time of the drx-onDurationTimer1 in accordance with the aforementioned manner in which the short cycle is currently used, and determine whether to start drx-InactivityTimer1 according to whether the initial transmission PDCCH is received, which will not be repeated.

At this point, DRX group1 is switched from the Short DRX Cycle to the Long DRX Cycle, while the DRX group2 still uses the short DRX Cycle.

It can be understood that it is exemplary that the cycle switching instruction is DRX MAC CE or Long DRX MAC CE. In an actual scenario, the cycle switching instruction can also be other variations, for example, establishing an association relation between other RRC messages and the long cycle (or short cycle).

In manner 2, the cycle switching processing is performed only for the DRX group that has received the cycle switching instruction, which can realize the personalized management of respective DRX groups, make the management manner more flexible, and can adapt to the needs of different communication scenarios.

Manner 3

In manner 3, a cycle switching instruction is used to indicate one target cycle. At this point, the target DRX group is a DRX group corresponding to the cycle switching instruction.

In this implementation, there can be a plurality of cycle switching instructions. In this embodiment, a corresponding relationship between the cycle switching instruction and the DRX group needs to be preset in advance, and each cycle switching instruction is used to instruct its corresponding DRX group to perform cycle switching.

At this point, the number of cycle switching instructions is related to the number of DRX groups. For any terminal device, if the terminal device is provided with N DRX groups, the number of the cycle switching instructions can be 2N, where N is an integer greater than 1. The case where the terminal device is provided with one DRX group will not be discussed in the embodiment of the present application for the time being.

In an actual scenario, instruction identifications of a plurality of cycle switching instructions are different. In a possible embodiment, LCID (Logical Channel Identity) can be used to identify and distinguish the cycle switching instructions. As such, when the corresponding relationship between the cycle switching instruction and the DRX group is preset, the corresponding relationship between the LCID and the DRX group can also be directly preset.

In an exemplary embodiment, the cycle switching instruction may include: DRX MAC CE, Long DRX MAC CE, enhanced DRX MAC CE and enhanced Long DRX MAC CE, where ICIDs of any two cycle switching instructions are different. In this embodiment, the identities of the target cycle can be realized through only the enhanced DRX MAC CE and the enhanced Long DRX MAC CE. At this point, payload sizes of the enhanced DRX MAC CE and the enhanced Long DRX MAC CE can be 0.

At this point, Long DRX MAC CE is used to instruct DRX GROUP1 to perform discontinuous reception in accordance with a long cycle; DRX MAC CE is used to instruct DRX GROUP1 to perform discontinuous reception in accordance with a short cycle; enhanced Long DRX MAC CE is used to instruct DRX GROUP2 to perform discontinuous reception in accordance with a long cycle; enhanced DRX MAC CE is used to instruct DRX GROUP2 to perform discontinuous reception in accordance with a short cycle. By contrast, Long DRX MAC CE and DRX MAC CE are used to instruct DRX GROUP2 to perform cycle switching; enhanced DRX MAC CE and enhanced Long DRX MAC CE are used to instruct DRX GROUP1 to perform cycle switching.

In another exemplary embodiment, the cycle switching instruction may include: DRX MAC CE (1~N) and Long DRX MAC CE (1~N). At this point, DRX MAC CEi is used to instruct the i-th DRX group to perform discontinuous reception in accordance with a short cycle; Long DRX MAC CEi is used to instruct the i-th DRX group to perform discontinuous reception in accordance with a long cycle, where the value of i is 1~N (contains endpoints 1 and N).

Figure 6:
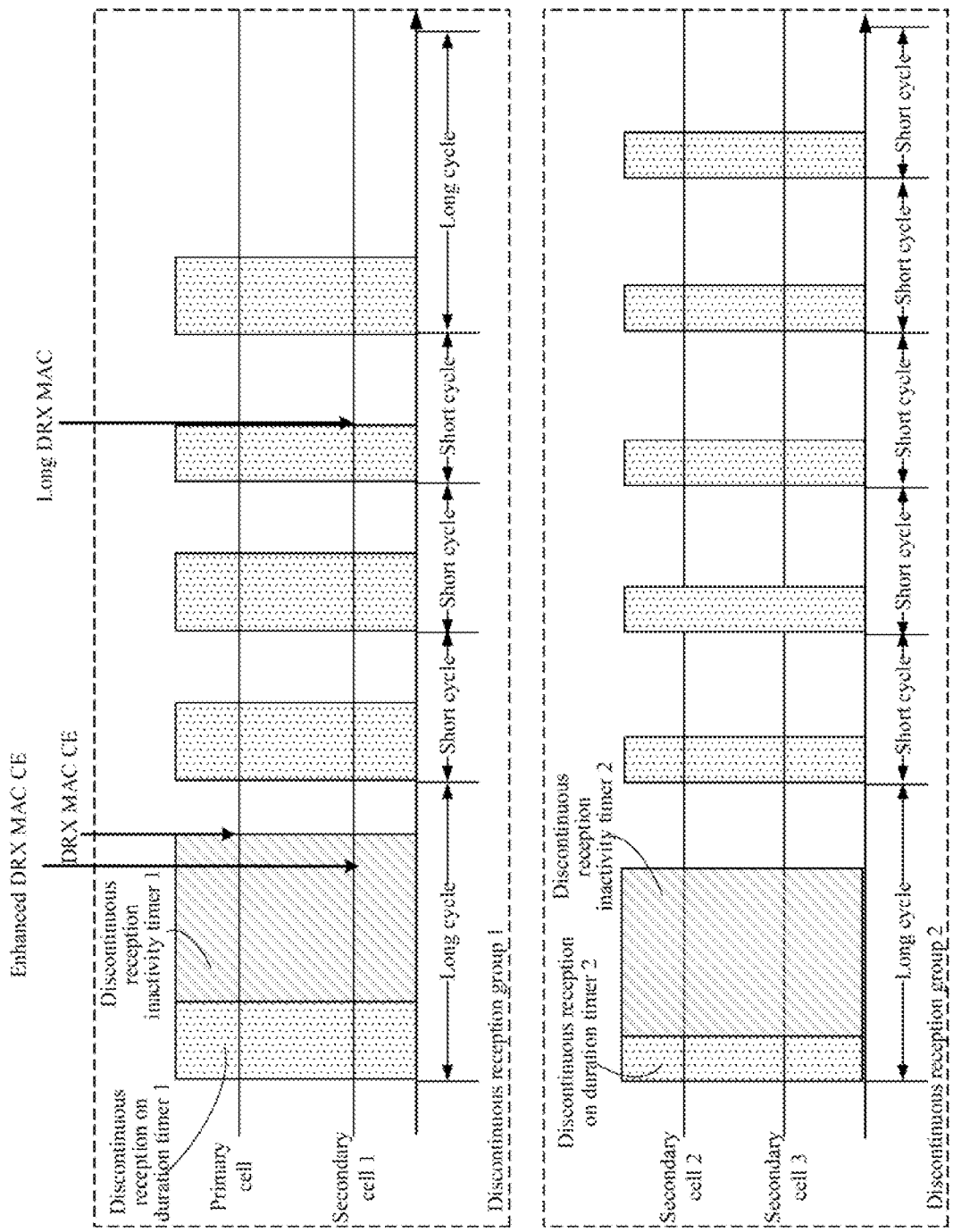
FIG. 6 is a schematic diagram of another discontinuous reception control method provided by an embodiment of the present application.

Exemplarily, reference may be made to the case shown in FIG. 6. The DRX configuration case in FIG. 6 is the same as that in FIG. 4, which is not repeated here. In FIG. 6, a cycle switching instruction may include: DRX MAC CE, Long DRX MAC CE, and enhanced DRX MAC CE, as described in the previous embodiment.

As shown in FIG. 6, in the initial state, both DRX group 1 and DRX group 2 use Long DRX Cycle.

Afterwards, the terminal device receives the enhanced DRX MAC CE from the base station on the SCell1, the target cycle is a short cycle, and the target DRX group is DRX group2. At this point, the terminal device can control drx-onDurationTimer2 and drx-InactivityTimer2 to stop timing, and at the same time, adopt drx-ShortCycleTimer2 for DRX group2 to begin timing.

At this point, DRX group1 still uses the Long DRX Cycle, and DRX group2 is switched from the Long DRX Cycle to the Short DRX Cycle.

Afterwards, the terminal device receives the DRX MAC CE from the base station on the PCell, the target cycle is a short cycle, and the target DRX group is DRX group1. At this point, the terminal device can control drx-onDurationTimer1 and drx-InactivityTimer1 to stop timing, and at the same time, use drx-ShortCycleTimer1 for DRX group1 to begin timing.

At this point, DRX group1 is switched from the Long DRX Cycle to the Short DRX Cycle, while DRX group2 still uses the Short DRX Cycle.

After that, the terminal device receives the Long DRX MAC CE from the base station on SCell1, the target cycle is a long cycle, and the target DRX group is DRX group1. At this point, the terminal device can control drx-ShortCycleTimer1 to begin timing.

As such, DRX group1 is switched from Short DRX Cycle to Long DRX Cycle, while DRX group2 still uses Short DRX Cycle.

In manner 3, no matter which serving cell receives the cycle switching instruction, the terminal device only needs to determine its associated target DRX group and the indicated target cycle according to the cycle switching instruction to perform cycle switching processing for the target DRX group. This implement realizes the determination of the target DRX group and the target cycle through the cycle switching instruction, which is simple and easy to implement.

Manner 4

In manner 4, the cycle switching instruction is used to indicate a plurality of target cycles. Specifically, the cycle switching instruction can include a plurality of indication characters, and the indication characters correspond to the DRX groups one-to-one. At this point, the indication characters are respectively used to indicate a target cycle of a corresponding DRX group.

Exemplarily, the cycle switching instruction can be enhanced DRX MAC CE or enhanced Long DRX MAC CE, where a payload of the enhanced DRX MAC CE has N bits, and each bit thereof is used to indicate whether the DRX group uses Short DRX Cycle; while a payload of the enhanced Long DRX MAC CE has N bits, and each bit thereof is used to indicate whether the DRX group uses Long DRX Cycle. As has been previously described, N is an integer greater than 1.

Specifically, the embodiment of the present application is to indicate whether to switch the cycle through values of the N bits in a payload of the cycle switching instruction. The values used to indicate the switch can be preset as needed, for example, it is preset to 1.

In one exemplary embodiment, the payload of the enhanced DRX MAC CE has 2 bits. When the value of the first bit is 1, it indicates that DRX group 1 adopts Short DRX Cycle for discontinuous reception. When the value of the second bit is 1, it indicates that DRX group2 adopts Short DRX Cycle for discontinuous reception.

It should be understood that in the payload of the cycle switching instruction, which bit is used to indicate which DRX group can be agreed in advance, and the foregoing examples should not be regarded as a limitation to this solution.

In another exemplary embodiment, the payload of the enhanced Long DRX MAC CE has 2 bits. When the value of the first bit is 1, it indicates that DRX group 1 adopts Long DRX Cycle for discontinuous reception. When the value of second bit is 1, it indicates that DRX group1 adopts Long DRX Cycle for discontinuous reception.

Figure 7:
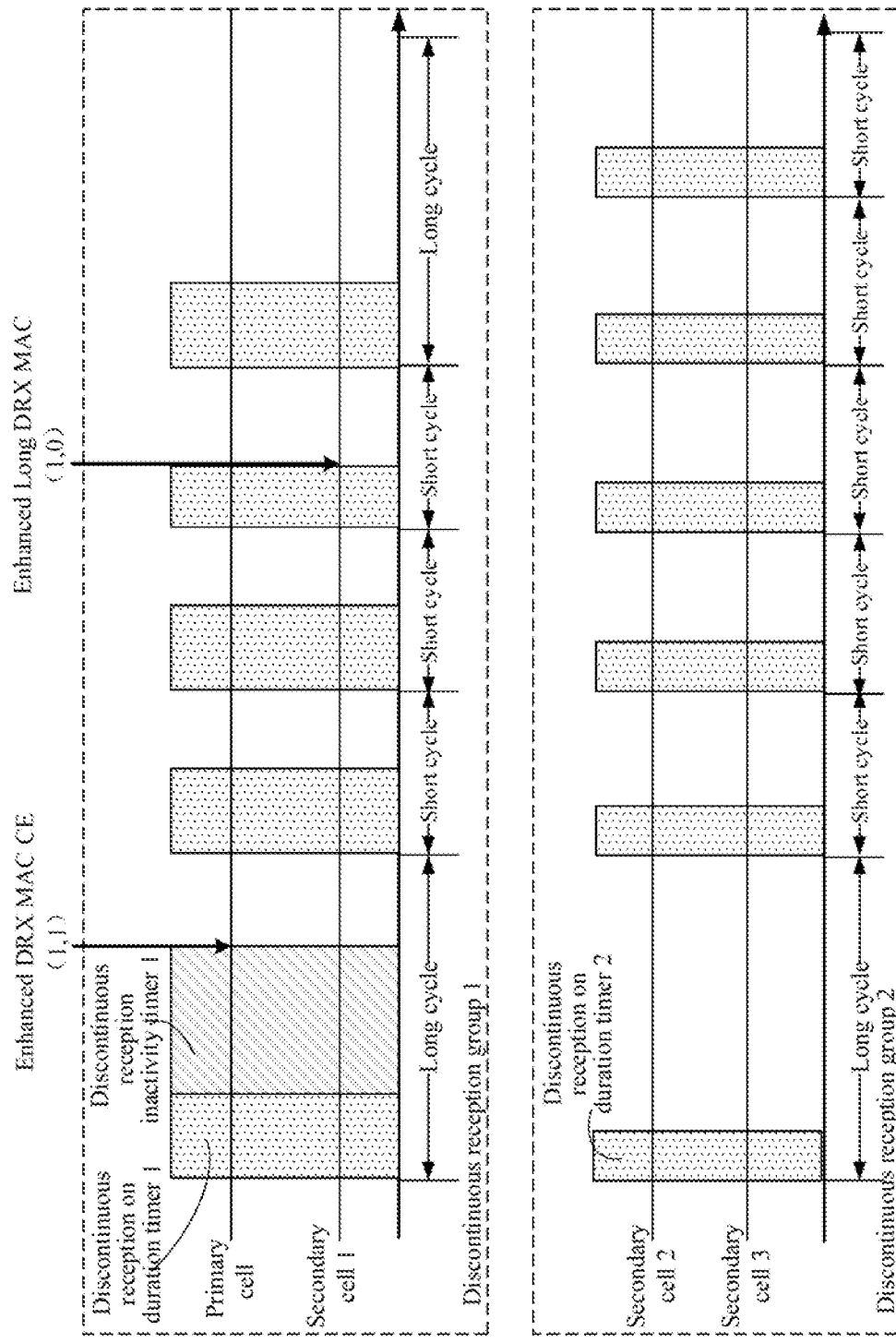
FIG. 7 is a schematic diagram of another discontinuous reception control method provided by an embodiment of the present application.

Exemplarily, reference may be made to the case shown in FIG. 7. The DRX configuration case in FIG. 7 is the same as that in FIG. 4, which will not be repeated here.

As shown in FIG. 7, in the initial state, both DRX group 1 and DRX group 2 use Long DRX Cycle.

Afterwards, the terminal device receives the enhanced DRX MAC CE from the base station on the PCell, where in a payload of the message, both values of the first bit and the second bit are 1. Then, the target cycle is a short cycle, and the target DRX groups are DRX group1 and DRX group2. At this point, the terminal device controls all of drx-onDurationTimer1, drx-InactivityTimer1, drx-onDurationTimer2, and drx-InactivityTimer2 to stop timing, and at the same time, adopts drx-ShortCycleTimer for DRX group1 and DRX group2 to begin timing.

At this point, DRX group1 and DRX group2 are switched from Long DRX Cycle to Short DRX Cycle.

Afterwards, the terminal device receives the enhanced Long DRX MAC CE from the base station on the SCell1, where in a payload of the massage, a value of the first bit is 1. Then, the target cycle is a long cycle, and the target DRX group is DRX group1. Then, the terminal device can control the drx-ShortCycleTimer1 of DRX group1 to stop timing.

At this point, DRX group1 is switched from Short DRX Cycle to Long DRX Cycle, while DRX group2 uses Short DRX Cycle.

In manner 4, the embodiment of the present application performs adjustment on the cycle switching instruction, which can use a cycle switching instruction to realize cycle switching for one or more DRX groups. The implementation manner is simple and flexible.

Furthermore, in any one of the foregoing embodiments, the design for the cycle switching instruction needs to maintain synchronization between the base station and the terminal device. For the base station, the discontinuous reception method executed by it can include the following steps:

generating a cycle switching instruction; and
sending the cycle switching instruction to a terminal device.

In an exemplary embodiment (manner 1), the cycle switching instruction is used to instruct all DRX groups of the MAC entity to perform discontinuous reception in accordance with the target cycle.

In another exemplary embodiment (manner 2), the cycle switching instruction is used to instruct a DRX group where a serving cell that receives the cycle switching instruction is located to perform discontinuous reception in accordance with the target cycle.

In another exemplary embodiment (manner 3), the cycle switching instruction corresponds to the DRX groups one-to-one, and the cycle switching instruction is used to instruct a corresponding DRX group to perform discontinuous reception in accordance with the target cycle.

In another exemplary embodiment (manner 4), the cycle switching instruction includes a plurality of indication characters, the indication characters correspond to the DRX groups one-to-one, and the indication characters are respectively used to indicate a target cycle of a corresponding DRX group.

It should be understood that the related illustration of the cycle switching instruction and the management method executed by the terminal device based on the cycle switching instruction are as described above, which will not be repeated in the embodiments of the present application.

In summary, the technical solutions provided by the embodiments of the present application provide a variety of simple and feasible DRX cycle switching strategies for a terminal device provided with a plurality of DRX groups, which solves the problem of unclear DRX cycle switching strategies in this scenario, and reduces the impact of the problem on scheduling performance of the terminal. In addition, this is conducive to save electric quantity of the terminal.

The embodiment of the present disclosure further provides a device embodiment for implementing the steps and methods in the above-mentioned method embodiment.

An embodiment of the present disclosure provides a terminal device. Please refer to FIG. 8, the terminal device 800 has one or more MAC entities, there is at least one MAC entity provided with a plurality of discontinuous reception DRX groups, and the terminal device 800 includes:

a transceiver module 82, configured to receive a cycle switching instruction sent from a base station; and
a processing module 84, configured to control a target DRX group to perform discontinuous reception in accordance with a target cycle, where the target DRX group is one or more DRX groups of the MAC entity.

The terminal device provided in this embodiment is used to execute the technical solution on the terminal device side in any one of the foregoing method embodiments, of which implementation principle and technical effect are similar, based on the received cycle switching instruction, control one or more DRX groups to perform switching control in accordance with the target cycle, which reduces the impact of unclear cycle switching strategy on scheduling performance of the terminal, and is conducive to saving electric quantity of the terminal.

Figure 8:
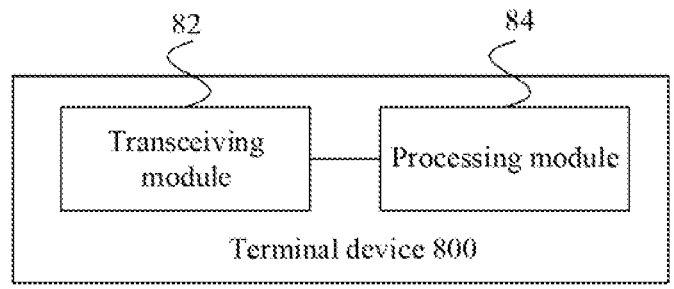
FIG. 8 is a functional block diagram of a terminal device provided by an embodiment of the present application.

Based on the above-mentioned embodiment shown in FIG. 8, in an embodiment of the present application, the cycle switching instruction is used to indicate a target cycle.

Based on the above-mentioned embodiment shown in FIG. 8, in another embodiment of the present application, the target DRX group is all DRX groups of the MAC entity.

Based on the above-mentioned embodiment shown in FIG. 8, in another embodiment of the present application, the target DRX group is a DRX group where a serving cell receives the cycle switching instruction is located.

Based on the above-mentioned embodiment shown in FIG. 8, in another embodiment of the present application, the target DRX group is a DRX group corresponding to the cycle switching instruction.

Based on the above-mentioned embodiment shown in FIG. 8, in another embodiment of present application, cycle switching instruction includes a plurality of indication characters, the indication characters correspond to the DRX groups one-to-one, and the indicator characters are respectively used to indicate the target cycle of the corresponding DRX group.

At that point, the processing module 84 is specifically configured to: determine the target cycle of each DRX group in accordance with the plurality of indication characters; and switch DRX cycles of respective DRX groups to the target cycle.

Based on the above-mentioned embodiment shown in FIG. 8 and any one of the foregoing embodiments, in another embodiment of the present application, the target cycle includes: a long cycle and a short cycle, and a cycle duration of the long cycle is greater than a cycle duration of the short cycle.

Based on the above-mentioned embodiment shown in FIG. 8 and any one of the foregoing embodiments, in another embodiment of the present application, the terminal device meets at least one of following: durations of discontinuous reception on duration timers of any two DRX groups in the terminal device are different; or durations of discontinuous reception inactivity timers of any two DRX groups in the terminal equipment are different.

Based on the above-mentioned embodiment shown in FIG. 8 and any one of the foregoing embodiments, in another embodiment of the present application, the processing module 84 is specifically configured to: when the target cycle is a short cycle, control a discontinuous reception on duration timer and a discontinuous reception inactivity timer to stop timing; and control a discontinuous reception short cycle timer to begin timing.

Based on the above-mentioned embodiment shown in FIG. 8 and any one of the foregoing embodiments, in another embodiment of the present application, the processing module 84 is specifically configured to: when the target cycle is a long cycle, control a discontinuous reception short cycle timer to stop timing.

Based on the above-mentioned embodiment shown in FIG. 8 and any one of the foregoing embodiments, in another embodiment of the present application, the transceiving module 82 is further configured to receive a DRX configuration instruction from the base station, where the DRX configuration instruction carries configuration parameters of respective DRX groups; and the processing module 84 is further configured to perform DRX configuration on respective DRX groups respectively in accordance with the configuration parameters.

Figure 9:
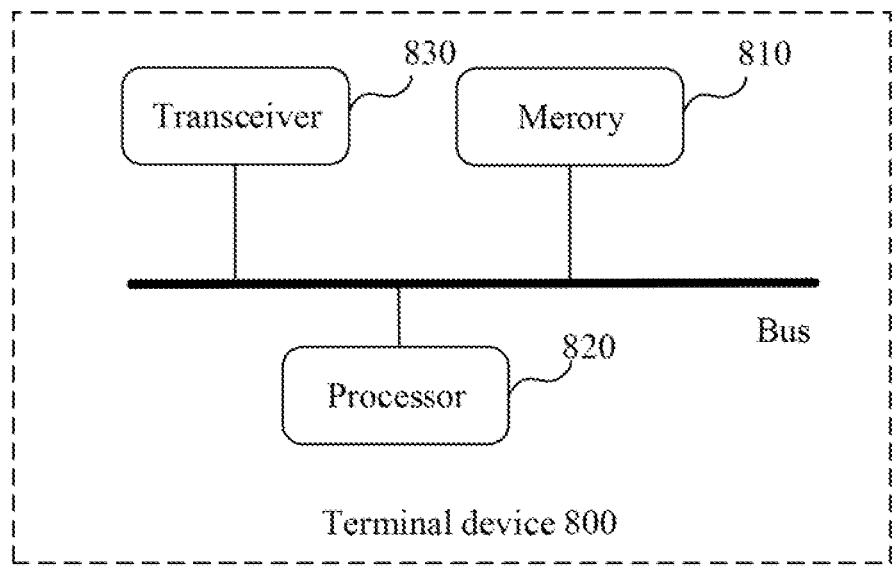
FIG. 9 is a schematic diagram of a physical structure of a terminal device provided by an embodiment of the present application.

FIG. 9 is schematic diagram of the physical structure of a terminal device provided by the present application. As shown in FIG. 9, the terminal device 800 includes a processor 820, a memory 810 and a transceiver 830;

the memory 810 stores computer execution instructions;
the processor 820 executes the computer-executable instructions stored by the memory 810 to cause the processor 830 to execute a technical solution on the terminal device side in any one of the foregoing method embodiments.

In a specific implementation of the terminal device shown in FIG. 9 above, the memory 810, the processor 820, and the transceiver 830 may be connected through a bus with each other. In an embodiment, the memory 810 may be integrated within the processor 820.

FIG. 9 is a simple design of the terminal device. The embodiment of the present application does not limit the number of processors and memories in the terminal device. FIG. 9 only takes the number of 1 as an example for illustration.

The embodiment of the present disclosure provides a base station. Please refer to FIG. 10, the base station 1000 includes:

a processing module 1002, configured to generate a cycle switching instruction; and
a transceiver module 1004, configured to send the cycle switching instruction to a terminal device to cause the terminal device to control a target DRX group to perform discontinuous reception in accordance with a target cycle, where the target DRX group is one or more DRX groups of an MAC entity in the terminal device.

Figure 10:
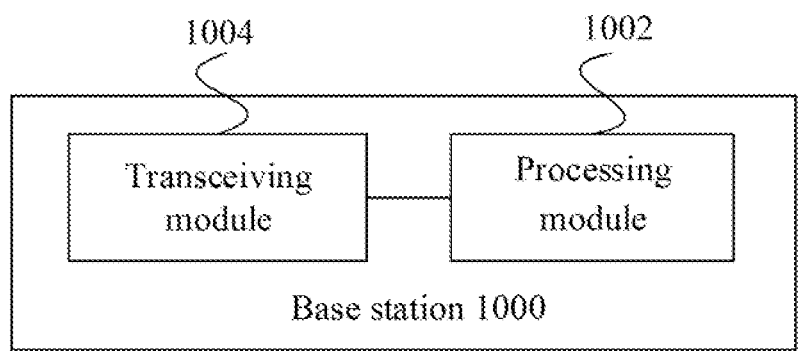
FIG. 10 is a functional block diagram of a base station provided by an embodiment of the present application.

Based on the above-mentioned embodiment shown in FIG. 10, in another embodiment of the present application, the cycle switching instruction is used to instruct all DRX groups of the MAC entity to perform discontinuous reception in accordance with the target cycle.

Based on the above-mentioned embodiment shown in FIG. 10, in another embodiment of the present application, the cycle switching instruction is used to instruct a DRX group where a serving cell that receives the cycle switching instruction is located to perform discontinuous reception in accordance with the target cycle.

Based on the above-mentioned embodiment shown in FIG. 10, in another embodiment of present application, the cycle switching instruction corresponds to the DRX groups one-to-one, and the cycle switching instruction is used to instruct a corresponding DRX group to perform discontinuous reception in accordance with the target cycle.

Based on the above-mentioned embodiment shown in FIG. 10, in another embodiment of present application, the cycle switching instruction includes a plurality of indication characters, the indication characters correspond to the DRX groups one-to-one, and the indication characters are respectively used to indicate a target cycle of a corresponding DRX group.

Figure 11:
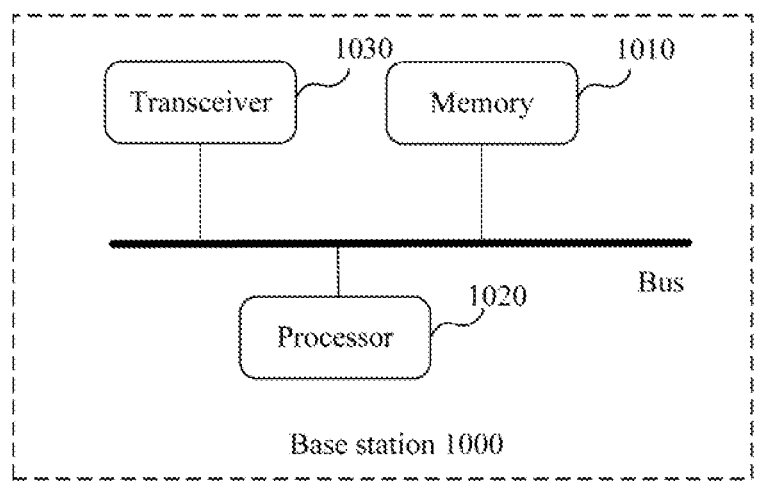
FIG. 11 is a schematic diagram of a physical structure of a base station provided by an embodiment of the present application.

FIG. 11 is a schematic diagram of the physical structure of a base station provided by the present application. As shown in FIG. 11, the base station 1000 includes: a processor 1020, a memory 1010, and a transceiver 1030;

the memory 1010 stores computer execution instructions;
the processor 1020 executes the computer-executable instructions stored by the memory 1010 to cause the transceiver 1030 to execute a technical solution on the base station side in any one of the foregoing method embodiments.

In a specific implementation of the base station shown in FIG. 11 above, the memory 1010, the processor 1020 and the transceiver 1030 can be connected through a bus with each other. In an embodiment, the memory 1010 may be integrated within the processor 1020.

FIG. 11 is a simple design of the base station. The embodiment of the present application does not limit the number of processors and memories in the base station. FIG. 11 only takes the number of 1 as an example for illustration.

An embodiment of the present application also provides a computer-readable storage medium, the computer-readable storage medium stores computer-executable instructions, and the computer-executable instructions, when executed by a processor, are used to implement the technical solution of the terminal device in any one of the foregoing method embodiments.

An embodiment of the present application also provides a computer-readable storage medium, the computer-readable storage medium stores computer-executable instructions, and the computer-executable instructions, when executed by a processor, are used to implement the technical solution of the base station in any one of the foregoing method embodiments.

An embodiment of the present application also provides a program, which, when executed by a processor, is used to execute the technical solution of the terminal device in any one of the foregoing method embodiments.

An embodiment of the present application also provides a program, which, when executed by a processor, is used to execute the technical solution of the base station in any one of the foregoing method embodiments.

In an embodiment, the foregoing processor may be a chip.

An embodiment of the present application also provides a computer program product, including program instructions, and the program instructions are used to implement the technical solution of the terminal device in any one of the foregoing method embodiments.

An embodiment of the present application also provides a computer program product, including program instructions, and the program instructions are used to implement the technical solution of the base station in any one of the foregoing method embodiments.

An embodiment of the present application also provides a chip, including a processing module and a communication interface, and the processing module can execute the technical solution on the terminal device side in any one of the foregoing method embodiments.

Further, the chip further includes a storage module (such as a memory), configured to store instructions, and a processing module, configured to execute the instructions stored by the storage module, and execution of the instructions stored in storage module causes the processing module to execute the technical solution on the terminal device side in any one of the foregoing method embodiments.

An embodiment of the present application also provides a chip, including a processing module and a communication interface, and the processing module can execute the technical solution on the base station side in any one of the foregoing method embodiments.

Further, the chip further includes a storage module (such as a memory), configured to store instructions, and a processing module, configured to execute the instructions stored by the storage module, and execution of the instructions stored in storage module causes the processing module to execute the technical solution on the base station side in any one of the foregoing method embodiments.

In the several embodiments provided by the present application, it should be understood that the disclosed devices and methods may be implemented in other manners. For example, the device embodiments described above are merely illustrative. For example, the division of the modules is merely a logical function division, and in actual implementation, there may be another division manner, for example, multiple modules may be combined or may be integrated into another system, or some features can be omitted or not executed. In addition, the mutual coupling or direct coupling or communication connection shown or discussed may be an indirect coupling or communication connection through some interfaces, modules, and may be electrical, mechanical or in other forms.

In the specific implementation of the above-mentioned terminal device and network equipment, it should be understood that the processor may be a central processing unit (CPU for short), or another general-purpose processor, a digital signal processor (DSP for short), an application specific integrated circuit (ASIC for short) and so on. The general-purpose processor may be a microprocessor or the processor may also be any conventional processor or the like. The steps of the method disclosed in combined with the present application may be directly embodied as being executed completed by a hardware processor, or executed and completed by a combination of hardware and software modules in the processor.

All or part of the steps implementing foregoing method embodiments can be accomplished by a program instructing related hardware. The aforementioned program can be stored in a readable memory. When the program is executed, it executes the steps that include the foregoing method embodiments; and the foregoing memory (storage medium) includes: read-only memory (ROM for short), RAM, flash memory, hard disk, solid state disk, magnetic tape, floppy disk, optical disc and any combination thereof.

What is claimed is:

1. A discontinuous reception control method, applied to a terminal device, wherein the terminal device has one or more Medium Access Control (MAC) entities, and there is at least one MAC entity provided with a plurality of discontinuous reception (DRX) groups, the terminal device being in a plurality of serving cells including a primary cell (PCell) and one or more secondary cells (SCells), wherein, for any DRX group in the terminal device, the serving cell corresponding to this DRX group performing discontinuous reception in accordance with DRX group configuration parameter of the DRX group;

the method comprises:
   receiving, by the terminal device, on a serving cell, a cycle switching instruction and configuration parameters of respective DRX groups, said cycle switching instruction indicating at least one target cycle; and
   using a target DRX group to perform discontinuous reception in accordance with the received target cycle;
   wherein when the serving cell that receives the cycle switching instruction corresponds to only one DRX group of a MAC entity provided with a plurality of DRX groups, the only target DRX group is the DRX group corresponding to the serving cell that receives the cycle switching instruction;
   wherein the cycle switching instruction is used to indicate one target cycle, the target DRX group is all DRX groups of the MAC entity.

2. The method according to claim 1, wherein the target cycle comprises: a long cycle and a short cycle; a cycle duration of the long cycle is greater than a cycle duration of the short cycle.

3. The method according to claim 1, wherein in any two DRX groups in the terminal device, one or more of a discontinuous reception inactivity timer (drx-InactivityTimer), and discontinuous reception on duration timer (drx-onDurationTimer) are different, and configuration parameters of timers except for drx-InactivityTimer and drx-onDurationTimer are common.

4. The method according to claim 2, wherein if the terminal device receives a short cycle switching instruction, the terminal device controls the DRX group corresponding to the serving cell that receives the cycle switching instruction to adopt a short cycle for discontinuous reception, while any DRX group that does not correspond with the serving cell that receives the cycle switching instruction does not switch cycle.

5. The method according to claim 2, wherein if the terminal device receives a long cycle switching instruction, the terminal device controls the DRX group corresponding to the serving cell that receives the cycle switching instruction to adopt a long cycle for discontinuous reception, while any DRX group that does not correspond with the serving cell that receives the cycle switching instruction does not switch cycle.

6. A terminal device, wherein the terminal device has one or more Medium Access Control (MAC) entities, there is at least one MAC entity provided with a plurality of discontinuous reception (DRX) groups, the terminal device being in a plurality of serving cells including a primary cell (PCell) and one or more secondary cells (SCells), wherein, for any DRX group in the terminal device, the serving cell corresponding to this DRX group performing discontinuous reception in accordance with DRX group configuration parameter of the DRX group, and the terminal device comprises:

a processor, a memory and a transceiver;

wherein the memory stores computer execution instructions;

the processor is configured to call and run the computer execution instructions stored in the memory to:

control the transceiver to receive, on a serving cell, a cycle switching instruction and configuration parameters of respective DRX groups, said cycle switching instruction indicating at least one target cycle; and use a target DRX group to perform discontinuous reception in accordance with the received target cycle;

wherein when the serving cell that receives the cycle switching instruction corresponds to only one DRX group of a MAC entity provided with a plurality of DRX groups, the only target DRX group is the DRX group corresponding to the serving cell that receives the cycle switching instruction;

wherein the cycle switching instruction is used to indicate one target cycle, the target DRX group is all DRX groups of the MAC entity.

7. The terminal device according to claim 6, wherein the target DRX group is a DRX group where a serving cell that receives the cycle switching instruction is located.

8. The terminal device according to claim 6, wherein the target DRX group is a DRX group corresponding to the cycle switching instruction.

9. The terminal device according to claim 6, wherein the cycle switching instruction comprises a plurality of indication characters, the indication characters correspond to the DRX groups one-to-one, and the indication characters are respectively used to indicate a target cycle of a corresponding DRX group.

10. The terminal device according to claim 9, wherein the processor is further configured to:

determine the target cycle of each DRX group in accordance with the plurality of indication characters; and switch DRX cycles of respective DRX groups to the target cycle.

11. The terminal device according to claim 6, wherein the target cycle comprises: a long cycle and a short cycle; a cycle duration of the long cycle is greater than a cycle duration of the short cycle.

12. The terminal device according to claim 2, wherein: the terminal device meets at least one of following:

durations of discontinuous reception on duration timers of any two DRX groups in the terminal device are different; or durations of discontinuous reception inactivity timers of any two DRX groups in the terminal device are different.

13. The terminal device according to claim 6, wherein the processor is configured to call and run the computer execution instructions stored in the memory to:

control the transceiver to receive a DRX configuration instruction from the base station, wherein the DRX configuration instruction carries configuration parameters of respective DRX groups; and perform DRX configuration on respective DRX groups in accordance with the configuration parameters.

14. The terminal device according to claim 6, wherein in any two DRX groups in the terminal device, one or more of a discontinuous reception inactivity timer (drx-Inactivity-Timer), and discontinuous reception on duration timer (drx-onDurationTimer) are different, and configuration parameters of timers except for drx-InactivityTimer and drx-onDurationTimer are common.

15. A base station, comprising:

a processor, a memory and a transceiver;

wherein the memory stores computer execution instructions;

the processor is configured to call and run the computer execution instructions stored in the memory to:

generate a cycle switching instruction and configuration parameters of respective discontinuous reception (DRX) groups, said cycle switching instruction indicating at least one target cycle; and control the transceiver to send, on a serving cell, the cycle switching instruction and configuration parameters of respective DRX groups to a terminal device to cause the terminal device to use the sent DRX group to perform discontinuous reception in accordance with the sent target cycle, wherein the target DRX group is one or more DRX groups of an Medium Access Control (MAC) entity in the terminal device, wherein the terminal device has one or more MAC entities, and there is at least one MAC entity provided with a plurality of DRX groups, the terminal device being in a plurality of serving cells including, a primary cell PCell and one or more secondary cells SCells, wherein, for any DRX group in the terminal device, the serving cell corresponding to this DRX group performing discontinuous reception in accordance with DRX group configuration parameter of the DRX group;

wherein when the serving cell that receives the cycle switching instruction corresponds to only one DRX group of a MAC entity provided with a plurality of DRX groups, the only indicated target DRX group is the DRX group corresponding to the serving cell that receives the cycle switching instruction;

wherein the cycle switching instruction is used to indicate one target cycle, the target DRX group is all DRX groups of the MAC entity.

16. The base station according to claim 15, wherein the cycle switching instruction is used to instruct all DRX groups of the MAC entity to perform discontinuous reception in accordance with the target cycle.

* * * * *